US012763379B2

(12) United States Patent
Bok et al.

(10) Patent No.: US 12,763,379 B2
(45) Date of Patent: Oct. 13, 2026

(54) PRISMATIC SECONDARY BATTERY HAVING IMPROVED STABILITY

(71) Applicant: LG ENERGY SOLUTION, LTD., Seoul (KR)

(72) Inventors: Cheon Hee Bok, Daejeon (KR); Joo Hwan Sung, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 471 days.

(21) Appl. No.: 18/566,997

(22) PCT Filed: Apr. 4, 2023

(86) PCT No.: PCT/KR2023/004505
§ 371 (c)(1),
(2) Date: Dec. 4, 2023

(87) PCT Pub. No.: WO2023/195730
PCT Pub. Date: Oct. 12, 2023

(65) Prior Publication Data

US 2024/0266615 A1 Aug. 8, 2024

(30) Foreign Application Priority Data

Apr. 5, 2022 (KR) ........................ 10-2022-0042011

(51) Int. Cl.

| | |
|---|---|
| ***H01M 10/42*** | (2006.01) |
| ***H01M 10/0585*** | (2010.01) |
| ***H01M 50/103*** | (2021.01) |
| ***H01M 50/54*** | (2021.01) |
| ***H01M 50/55*** | (2021.01) |
| ***H01M 50/553*** | (2021.01) |

(52) U.S. Cl.
CPC ... *H01M 10/4235* (2013.01); *H01M 10/0585* (2013.01); *H01M 50/103* (2021.01); *H01M 50/54* (2021.01); *H01M 50/55* (2021.01); *H01M 50/553* (2021.01)

(58) Field of Classification Search
CPC ......... H01M 10/4235; H01M 10/0585; H01M 50/54; H01M 50/55; H01M 50/553; H01M 50/103
See application file for complete search history.

(56) References Cited

U.S. PATENT DOCUMENTS

| | | | |
|---|---|---|---|
| 2010/0136411 | A1 | 6/2010 | Yoon et al. |
| 2010/0203381 | A1 | 8/2010 | Kim et al. |
| 2019/0363402 | A1 | 11/2019 | Shibata |

FOREIGN PATENT DOCUMENTS

| | | | |
|---|---|---|---|
| CN | 111477771 | A | 7/2020 |
| CN | 111971813 | A | 11/2020 |
| JP | 2013235831 | A | 11/2013 |
| JP | 2014099356 | A | 5/2014 |

(Continued)

*Primary Examiner* — Sarah A. Slifka
(74) *Attorney, Agent, or Firm* — Bryan Cave Leighton Paisner LLP

(57) ABSTRACT

Disclosed herein relates to an electrode assembly including: a plurality of unit cells, each unit cell comprising a positive electrode, a negative electrode, and a separator between the positive electrode and the negative electrode; and a protective stack layer on an outermost part of the electrode assembly, comprising a positive electrode foil, a negative electrode foil and a separator between the positive electrode foil and the negative electrode foil and on outer surfaces of the positive electrode foil and the negative electrode foil.

12 Claims, 5 Drawing Sheets

(56) References Cited

FOREIGN PATENT DOCUMENTS

| | | | |
|---|---|---|---|
| JP | 2014107144 | A | 6/2014 |
| JP | 2016152170 | A | 8/2016 |
| JP | 2020518100 | A | 6/2020 |
| KR | 10-2014-0062568 | A | 5/2014 |
| KR | 10-2015-0083499 | A | 7/2015 |
| KR | 10-2016-0009395 | A | 1/2016 |
| KR | 10-2016-0118684 | A | 10/2016 |
| KR | 10-2016-0132566 | A | 11/2016 |
| KR | 1020170045800 | A | 4/2017 |
| KR | 10-2017-0053488 | A | 5/2017 |
| KR | 10-2018-0085132 | A | 7/2018 |
| KR | 10-2018-0085139 | A | 7/2018 |
| KR | 10-2018-0100526 | A | 9/2018 |
| KR | 10-2019-0005425 | A | 1/2019 |
| KR | 10-2019-0050928 | A | 5/2019 |
| KR | 10-2019-0058850 | A | 5/2019 |
| KR | 10-2019-0065147 | A | 6/2019 |
| KR | 10-2019-0119508 | A | 10/2019 |
| KR | 1020200057978 | A | 5/2020 |
| KR | 10-2020-0132351 | A | 11/2020 |
| KR | 102196102 | B1 | 12/2020 |

[FIG. 1]
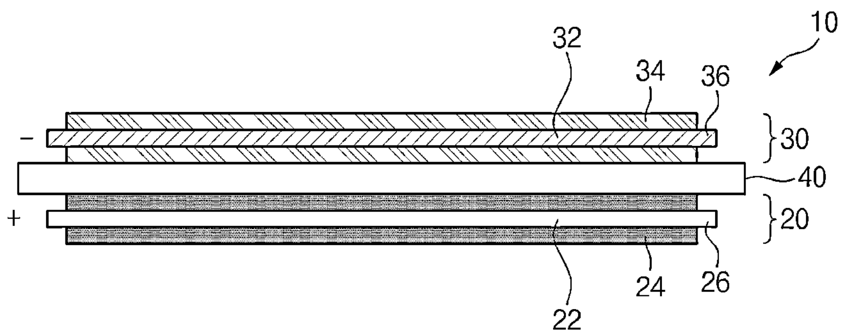
[FIG. 2]
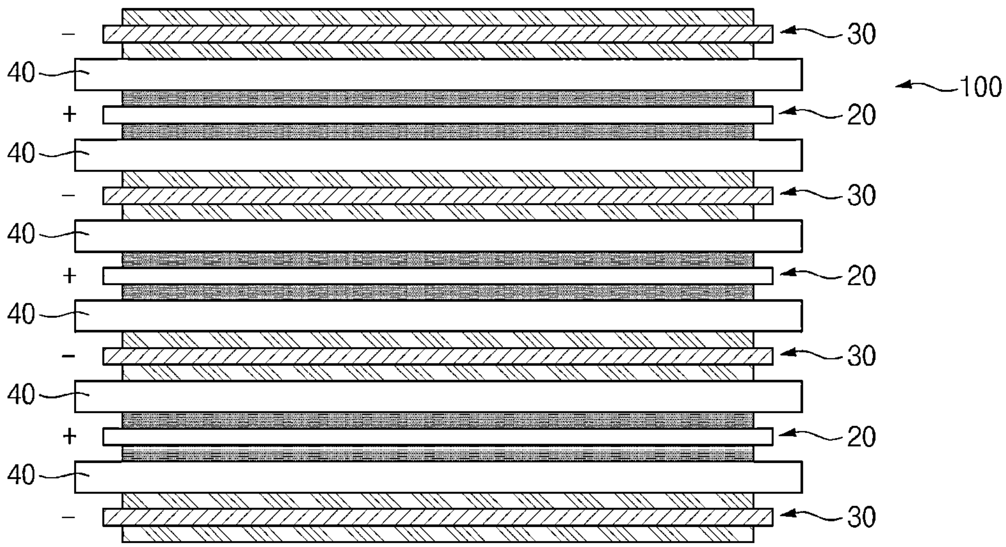

[FIG. 3]
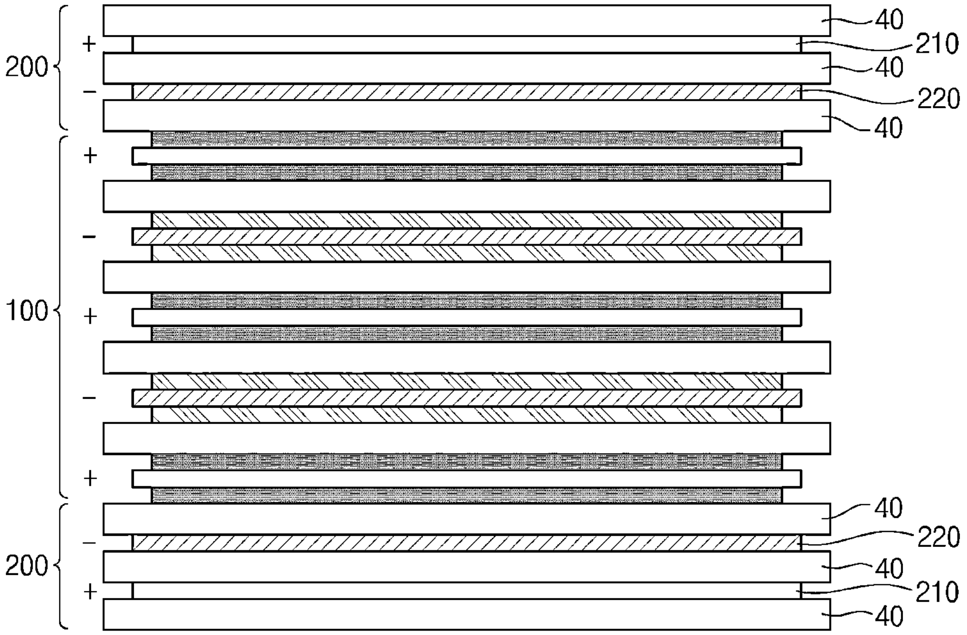

[FIG. 4]
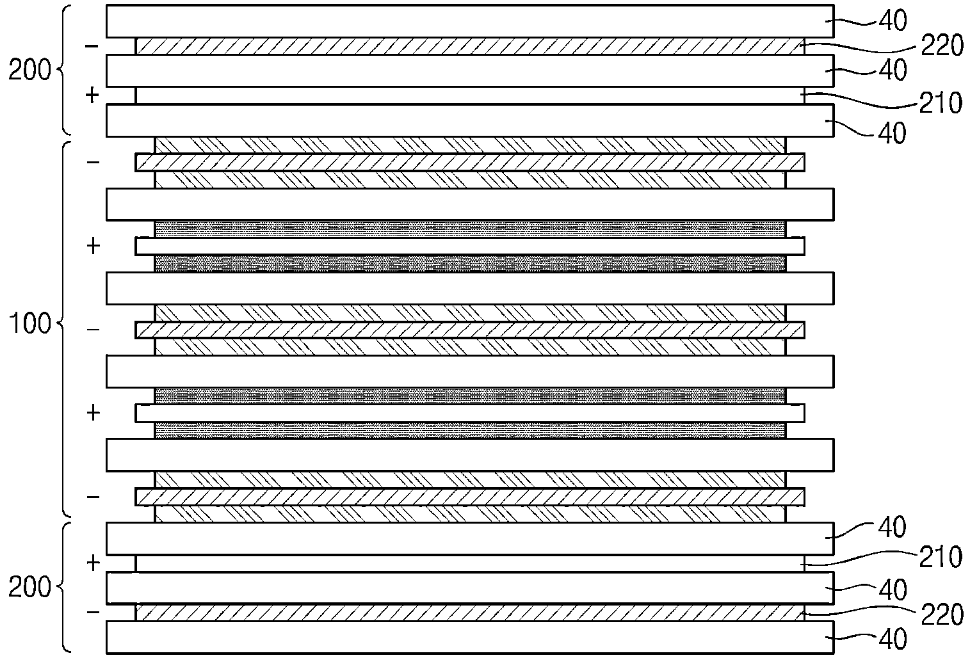

[FIG. 5]
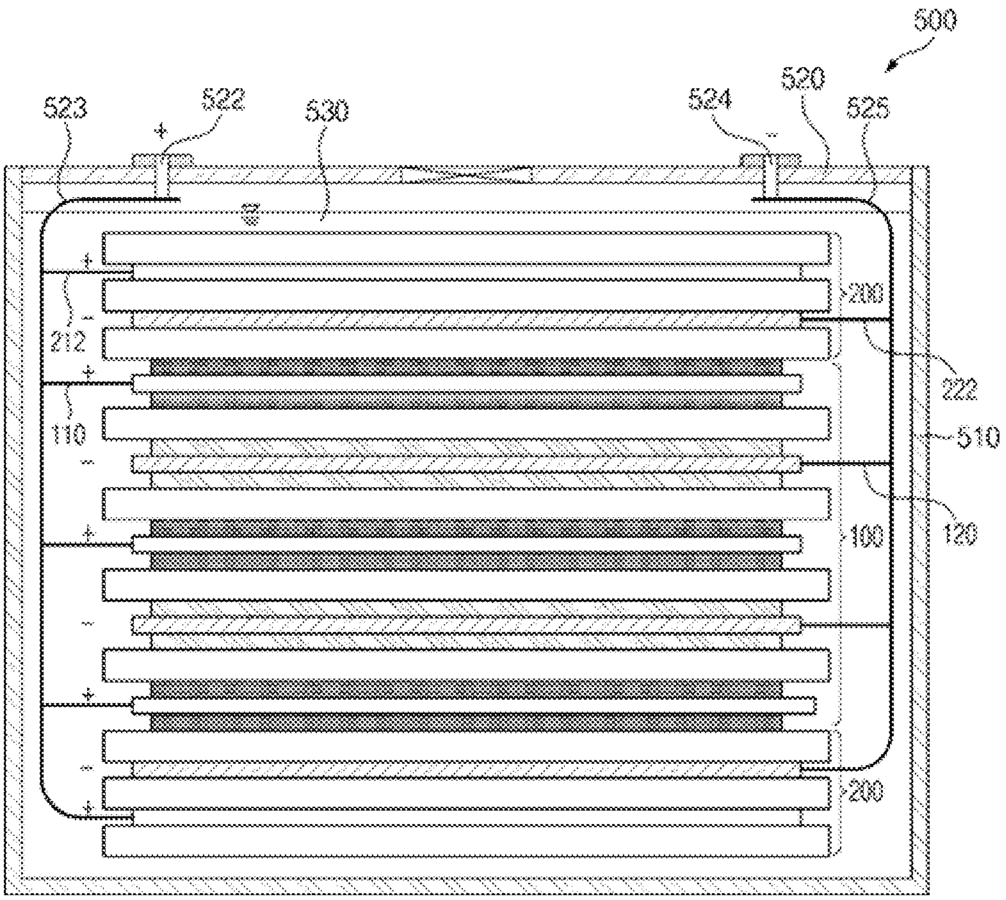

[FIG. 6]
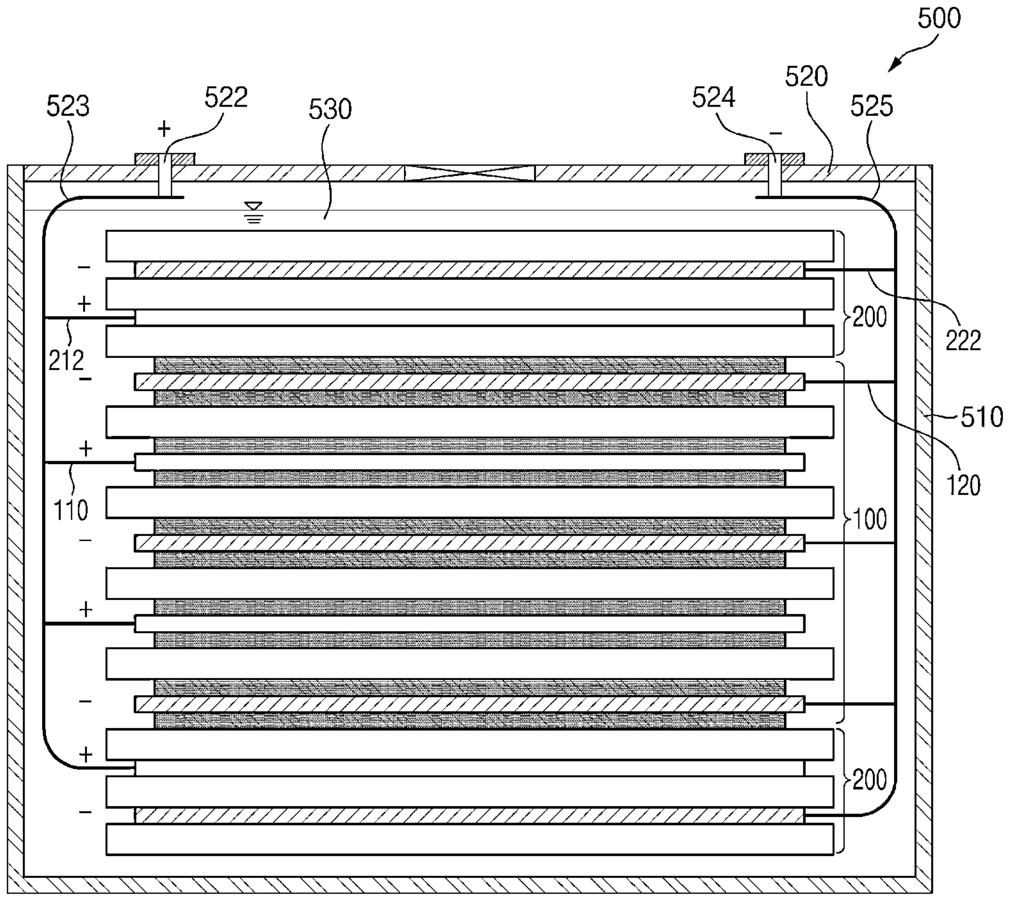

PRISMATIC SECONDARY BATTERY HAVING IMPROVED STABILITY

CROSS-REFERENCE TO RELATED APPLICATIONS

This application is a National Phase entry pursuant to 35 U.S.C. § 371 of International Application No. PCT/KR2023/004505, filed on Apr. 4, 2023, and claims the benefit of and priority to Korean Patent Application No. 10-2022-0042011, filed on Apr. 5, 2022, the disclosures of which are incorporated by reference in their entirety for all purposes as if fully set forth herein.

TECHNICAL FIELD

The present disclosure relates to a prismatic secondary battery with improved safety by preventing damage to an outer separator of an electrode assembly or explosion of an electrode assembly due to external impact.

BACKGROUND

Unlike primary batteries, secondary batteries are rechargeable and have been extensively researched and developed recently due to potential for miniaturization and high capacity applications. With the increasing technological advancements and demand for mobile devices, as well as the growing prominence of electric vehicles and energy storage systems in response to environmental concerns, the demand for secondary batteries as an energy source is rapidly and significantly increasing.

Depending on the shape of the battery case, secondary batteries are classified into coin-shaped batteries, cylindrical batteries, prismatic batteries, and pouch-type batteries. The electrode assembly, which is installed inside the battery case in secondary batteries, is a power generation element capable of charge and discharge. It has a laminated structure of electrodes and separators.

Electrode assemblies can be broadly categorized into three types: a Jellyroll type, which involves winding a positive electrode and a negative electrode of an active material-coated sheet with a separator interposed therebetween; a stack type, where a plurality of positive electrodes and negative electrodes are sequentially stacked with a separator interposed therebetween; and a Stack & Folding type, where the unit cells of the stack type are wound with a long separator film.

The prismatic secondary battery, which includes a prismatic case, encloses the completed electrode assembly within a case that has open sides. In such a process, the edges of the case can damage the outermost separator of the electrode assembly. In addition, the outermost separator of the electrode assembly may be damaged during use of the prismatic secondary battery by impacting the case, causing deformation, or by penetrating the case with something like a nail.

If the outermost separator of the electrode assembly is damaged due to any of these causes, it can lead to the breakdown of internal insulation. This can result in overheating damage caused by short-circuit, and eventually lead to thermal runaway, and various accidents such as combustion or explosion, etc. can happen.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY

Technical Problem

An object of the present disclosure is to provide a prismatic secondary battery with improved safety, capable of preventing various risks such as internal short-circuits, explosion, etc. resulting from damage to the outermost separator of an electrode assembly stacked with a plurality of unit cells in a stack structure.

However, the technical problems to be solved by the present disclosure are not limited to the above-described problem, and other problems not mentioned can be clearly understood by those skilled in the art from the following description of the present disclosure.

Technical Solution

The present disclosure relates to an electrode assembly, comprising: a plurality of unit cells, each unit cell comprising a positive electrode, a negative electrode, and a separator between the positive electrode and the negative electrode; and a protective stack layer on an outermost part of the electrode assembly, comprising a positive electrode foil, a negative electrode foil, and a separator between the positive electrode foil and the negative electrode foil and on outer surfaces of the positive electrode foil and the negative electrode foil.

In one embodiment of the present disclosure, when an outermost electrode of the electrode assembly is a positive electrode, the protective stack layer may comprise a structure that is laminated in the order of: the negative electrode foil, the separator, the positive electrode foil, and the separator.

Alternatively, when an outermost electrode of the electrode assembly is a negative electrode, the protective stack layer may comprise a structure that is laminated in the order of: the positive electrode foil, the separator, the negative electrode foil, and the separator.

The protective stack layer may be disposed on both outermost parts of the electrode assembly.

Moreover, it is preferable to a size of the protective stack layer to be equal to or larger than a size of an outermost unit cell of the electrode assembly.

In addition, the positive electrode foil and the negative electrode foil may comprise a positive electrode foil tab and a negative electrode foil tab, respectively, wherein the electrode assembly may comprise a positive electrode tab and a negative electrode tab, and wherein the positive electrode foil tab may be electrically connected to the positive electrode tab of the electrode assembly, and the negative electrode foil tab is electrically connected to the negative electrode tab of the electrode assembly.

Accordingly, the protective stack layer may buffer an internal short-circuit occurring in the electrode assembly.

Meanwhile, the present disclosure provides a prismatic secondary battery including: a housing in which at least one side forms an opening; an electrode assembly comprising a plurality of unit cells, each unit cell comprising a positive electrode, a negative electrode, and a separator between the positive electrode and the negative electrode, and the plurality of unit cells being stored inside the housing; a cap plate comprising a positive electrode terminal and a negative electrode terminal electrically connected to a positive electrode tab and a negative electrode tab of the electrode assembly, and is joined to seal the opening of the housing; and an electrolyte, wherein the electrode assembly further comprises a protective stack layer on an outermost part of the electrode assembly, comprising a positive electrode foil, a negative electrode foil, and a separator between the positive electrode foil and the negative electrode foil and on outer surfaces of the positive electrode foil and the negative electrode foil, respectively, wherein the positive electrode foil and the negative electrode foil comprise a positive electrode foil tab and a negative electrode foil tab, respectively, wherein the electrode assembly further comprises a positive electrode tab and a negative electrode tab, and wherein the positive electrode foil tab is electrically connected to the positive electrode tab of the electrode assembly, and the negative electrode foil tab is electrically connected to the negative electrode tab of the electrode assembly.

Here, when an outermost electrode of the electrode assembly is a positive electrode, the protective stack layer may comprise a structure that is stacked in the order of: the negative electrode foil, the separator, the positive electrode foil, and the separator.

Alternatively, when an outermost electrode of the electrode assembly is the negative electrode, the protective stack layer may comprise a structure that is stacked in the order of: the positive electrode foil, the separator, the negative electrode foil, and the separator.

Additionally, it is preferable for a size of the protective stack layer may be not smaller than a size of an outermost unit cell of the electrode assembly.

Additionally, the protective stack layer may buffer an internal short-circuit occurring in the electrode assembly.

Advantageous Effects

According to the present disclosure, the laminated structure of a positive electrode foil, a negative electrode foil, and a separator in the protective stack layer, which is equipped on the outermost part of the electrode assembly can prevent physical damage of the electrode assembly. Therefore, it is possible to prevent the damage of the electrode assembly caused by the outermost separator during the process of inserting the electrode assembly into the case (housing), or by a needle-shaped piercing, a compression, an impact, etc.

Also, in the present disclosure, since the positive electrode foil and the negative electrode foil forms a pair in the protective stack layer and is electrically connected to the positive electrode and negative electrode terminals of the cap plate, when an electrical short-circuit occurs, the protective stack layer reacts first compared to the active material-coated positive electrode and negative electrode of the electrode assembly, thereby mitigating an internal short-circuit. Accordingly, by the protective stack layer, the present disclosure can significantly reduce the risk of damage of the electrode assembly caused by internal short-circuits and the risks of fire or explosion due to thermal runaway of the electrode assembly.

However, advantageous effects of the present disclosure are not limited to those mentioned above, and other unmentioned advantageous effects should be clearly understood by those of ordinary skill in the art from the detailed description below.

BRIEF DESCRIPTION OF THE DRAWINGS

The following drawings accompanying this specification illustrate preferred exemplary embodiments of the present disclosure and are intended to serve as a further understanding of the technical ideas of the present disclosure in conjunction with the detailed description of the invention that follows, thereby the present disclosure is not to be construed as limited to that is described in such drawings.

FIG. 1 is a diagram illustrating a unit cell in which a separator is interposed between a positive electrode and a negative electrode.

FIG. 2 is a diagram illustrating an electrode assembly in which a plurality of unit cells of FIG. 1 is laminated in a stack structure.

FIG. 3 is a diagram illustrating an electrode assembly equipped with a protective stack layer according to an exemplary embodiment of the present disclosure.

FIG. 4 is a diagram illustrating an electrode assembly equipped with a protective stack layer according to another exemplary embodiment of the present disclosure.

FIG. 5 is a diagram illustrating an example of a prismatic secondary battery including the electrode assembly of FIG. 3.

FIG. 6 is a diagram illustrating an example of a prismatic secondary battery including the electrode assembly of FIG. 4.

DETAILED DESCRIPTION

The present disclosure may have various modifications and various examples, and thus specific examples are illustrated in the drawings and described in detail in the description. However, it should be understood that the present disclosure is not limited to specific embodiments, and includes all modifications, equivalents or alternatives within the spirit and technical scope of the present disclosure.

The terms "comprise," "include" and "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance. In addition, when a part of a layer, a film, a region or a plate is disposed "on" another part, this includes not only a case in which one part is disposed "directly on" another part, but a case in which a third part is interposed there between. In contrast, when a part of a layer, a film, a region or a plate is disposed "under" another part, this includes not only a case in which one part is disposed "directly under" another part, but a case in which a third part is interposed there between. In addition, in this application, "on" may include not only a case of disposed on an upper part but also a case of disposed on a lower part.

The present disclosure relates to an electrode assembly in which a plurality of unit cells is laminated in a stack structure with a separator interposed between a positive electrode and a negative electrode, and in one example, the outermost part of the electrode assembly is equipped with a positive electrode foil and a negative electrode foil, and a protective stack layer in which a separator is laminated between the positive electrode foil and the negative electrode foil, and on the outer part, respectively.

Accordingly, with the protective stack layer, the electrode assembly of the present disclosure can prevent damage to the outermost separator during the process of inserting it into the case (housing), or internal short-circuits generated by the damage of the outermost separator due to needle-shaped penetration, compression, or impact, etc. and various risks such as explosions caused by the internal short-circuit.

Furthermore, in the present disclosure, the positive electrode foil and negative electrode foil of the protective stack layer is provided with a positive electrode foil tab and a negative electrode foil tab. The positive electrode foil tab may be electrically connected to the positive electrode tab of the electrode assembly, and the negative electrode foil tab may be electrically connected to the negative electrode tab of the electrode assembly.

Accordingly, the protective stack layer in the present disclosure responds to internal shorts occurring in the electrode assembly a plurality of unit cells does, and buffers an electrical impact. Therefore, the electrode assembly of the present disclosure demonstrates robust durability against both mechanical and electrical damage.

The following description provides detailed information on specific embodiments of an electrode assembly and a prismatic secondary battery including the same, with reference to the attached drawings. It should be noted that the relative positions indicating front, rear, upper, lower, left, and right directions used in the following description are for the purpose of facilitating the understanding of the invention, and the orientation shown in the drawing is used as the reference unless otherwise defined.

First Embodiment

FIG. 1 is a diagram illustrating a unit cell (10) in which a separator (40) is interposed between a positive electrode (20) and a negative electrode (30). FIG. 2 is a diagram illustrating an electrode assembly (100) in which a plurality of unit cells (10) of FIG. 1 is laminated in a stacked structure.

Referring to FIG. 1, the depicted unit cell (10) represents a full cell where a separator (40) is interposed between the positive electrode (20) and the negative electrode (30).

The positive electrode (20) includes a positive electrode current collector (22) and a positive electrode active material (24) coated on one or both sides of the positive electrode current collector (22). A non-coated region (26) in which a positive electrode active material (24) is not coated exists at one end of the positive electrode current collector (22) in the width direction. The positive electrode tab (110) is formed by a notching (punching) process on the non-coated region (26).

The negative electrode (30) includes a negative electrode current collector (32) and a negative electrode active material (34) coated on one or both sides of the negative electrode current collector (32). A non-coated region (36) in which a negative electrode active material (34) is not coated exists at one end of the negative electrode current collector (32) in the width direction. In the same manner, the negative electrode non-coated region (36) functions as a negative electrode tab (120).

In the present disclosure, the positive electrode active material (24) coated on the positive electrode current collector (22) and the negative electrode active material (34) coated on the negative electrode current collector (32) can be used without limitation unless it is any active material commonly known in the art.

In the given example, the positive electrode active material (24) can include an alkali metal compound represented by the general chemical formula $A[A_xM_y]O_{2+z}$ (where A includes one or more elements among Li, Na, and K; M includes one or more elements selected from the group consisting of Ni, Co, Mn, Ca, Mg, Al, Ti, Si, Fe, Mo, V, Zr, Zn, Cu, Sc, Ru, and Cr; x≥0, 1≤x+y≤2, 0.1≤z≤2; and the stoichiometric coefficients of elements included in x, y, z, and M are chosen to maintain the compound's electrical neutrality).

In another example, the positive electrode active material (24) can be an alkali metal compound $xLiM^1O_2(1\times)Li_2M^2O_3$ described in patents such as U.S. Pat. Nos. 6,677,082 and 6,680,143 (where $M^1$ includes at least one element with an average oxidation state of 3, and $M^2$ includes at least one element with an average oxidation state of 4; 0≤x≤1).

In another example, the positive electrode active material (24) can be represented by the general chemical formula $Li_aM_x{}^1Fe_{1x}M_y{}^2P_{1y}M_z{}^3O_{4z}$(where $M^1$ includes at least one element selected among Ti, Si, Mn, Co, Fe, V, Cr, Mo, Ni, Nd, Mg, and Al; $M^2$ includes at least one element selected among Ti, Si, Mn, Co, Fe, V, Cr, Mo, Ni, Nd, Mg, Al, As, Sb, Si, Ge, V and S; $M^3$ includes a halogen element optionally including F; 0<a≤2, 0≤x≤1, 0≤y≤1, 0≤z≤1; the stoichiometric coefficients of the elements included in a, x, y, z, $M^1$, $M^2$, and $M^3$ are selected to maintain electrical neutrality of the compound). Alternatively, it can be a lithium metal phosphate represented by $Li_3M_2(PO_4)_3$ [where M includes at least one element selected among Ti, Si, Mn, Fe, Co, V, Cr, Mo, Ni, Mg, and Al].

Preferably, the positive electrode active material (24) can include primary particles and/or secondary particles in which primary particles are condensed.

In one example, the negative electrode active material (34) can include carbonaceous materials, lithium metal or lithium metal compounds, silicon or silicon compounds, tin or tin compounds, etc. Metal oxides such as $TiO_2$ and $SnO_2$ with a voltage of less than 2V can also be used as the negative electrode active material (34). For carbonaceous materials, low-crystalline carbon and high-crystalline carbon, etc. can be used.

As the separator (40) interposed between the positive electrode (20) and negative electrode (30), a porous polymer film made of polyolefin-based polymers, such as ethylene homopolymers, propylene homopolymers, ethylene/butene copolymers, ethylene/hexene copolymers, ethylene/methacrylate copolymers, can be used either individually or in a stacked configuration. As another example, the separator (40) can be a conventional porous nonwoven fabric made of materials such as glass fibers with high melting point, polyethylene terephthalate fibers, etc.

The separator (40) can include a coating layer of inorganic particles on at least one surface. Additionally, the separator (40) itself can be composed of a coating layer made of inorganic particles. The particles constituting the coating layer can have a structure that is coupled to a binder, allowing for the presence of interstitial volume between adjacent particles.

The inorganic particles can be composed of inorganic materials with a permittivity of 5 or more. For non-limiting example, the inorganic particles can include at least one or more materials selected from the group consisting of $Pb(Zr,Ti)O_3$(PZT), $Pb_{1x}La_xZr_{1y}$ $TiyO_3$(PLZT), $PB(Mg_3Nb_{2/3})O_3PbTiO_3$(PMNPT), $BaTiO_3$, hafnia($HfO_2$), $SrTiO_3$, $TiO_2$, $Al_2O_3$, $ZrO_2$, $SnO_2$, $CeO_2$, MgO, CaO, ZnO and $Y_2O_3$.

Furthermore, the electrolyte (530) in which the electrode assembly (100) is impregnated can be a salt having a structure of $A^+B^-$ Here, $A^+$ includes ions made of alkali metal positive ions such as $Li^+$, $Na^+$, $K^+$, or combinations thereof. And B includes any one or more negative ions selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The electrolyte can also be dissolved in an organic solvent. Examples of organic solvents that can be used include propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), γ-butyrolactone, or mixtures thereof.

FIG. 2 illustrates the electrode assembly (100) in which a plurality of unit cells (10) with the same configuration as mentioned above is laminated in a stack structure. The electrode assembly (100) of FIG. 2 is a bicell with a positive electrode/separator/negative electrode/separator/positive electrode structure, or it can also have a negative electrode/separator/positive electrode/separator/negative electrode structure. By laminating the bicell in an appropriate number, the capacity of the electrode assembly (100) can be further expanded.

FIG. 3 illustrates an electrode assembly (100) equipped with a protective stack layer (200) according to an exemplary embodiment of the present disclosure. The protective stack layer (200) is a laminated structure provided at the outermost part of the electrode assembly (100), comprising a positive electrode foil (210), a negative electrode foil (220), and a separator (40) laminated between the positive electrode foil (210) and the negative electrode foil (220) as well as on the outer part, respectively.

Here, the positive electrode foil (210) constituting the protective stack layer (200) is a metal corresponding to a positive electrode current collector (22) that is not coated with a positive electrode active material (24). The material of the positive electrode foil (210) can be the same as the positive electrode current collector (22). For example, both the positive electrode foil (210) and the positive electrode current collector (22) can be made of aluminum material. In the same manner, the negative electrode foil (220) is a metal corresponding to a negative electrode current collector (32) that is not coated with a negative electrode active material (34). The material of the negative electrode foil (220) can be the same as the negative electrode current collector (32). For example, both the negative electrode foil (220) and the negative electrode current collector (32) can be made of copper material.

The lamination structure of the positive electrode foil (210), negative electrode foil (220), and separator (40) in the protective stack layer (200) serves to prevent physical damage to the outermost part of the electrode assembly (100). In other words, the protective stack layer (200) helps to prevent damage to the outermost separator (40) during the insertion of the electrode assembly (100) into the case (510), or damage to the outermost separator (40) due to needle-shaped penetration, compression, or impact, etc. Therefore, it is preferable to size of the protective stack layer (200) to be not smaller than the size of the outermost unit cell (10) of the electrode assembly (100).

In FIG. 3, the electrode assembly (100) represents a configuration where the outermost electrode is the positive electrode (20) in which the protective stack layer (200) has a structure laminated in the order of: negative electrode foil (220), separator (40), positive electrode foil (210), and separator (40). Moreover, in FIG. 4, the electrode assembly (100) represents a configuration where the outermost electrode is a negative electrode (30). in which the protective stack layer has a structure laminated in the order of: positive electrode foil (210), separator (40), negative electrode foil (220), and separator (40). As illustrated, the protective stack layer (200) can be provided on both sides of the electrode assembly (100).

As described above, the protective stack layer (200) in the present disclosure varies in stacking order depending on the polarity of the outermost electrode in the electrode assembly (100). However, the positive electrode foil (210) always forms a pair with the negative electrode foil (220). This is not only to make the protective stack layer (200) serve as a mechanical barrier, but also as an electrical barrier. This will be further explained in detail in the relevant section.

Second Embodiment

FIG. 5 illustrates an example of a prismatic secondary battery (500) including the electrode assembly (100) from FIG. 3. FIG. 6 illustrates an example of a prismatic secondary battery (500) including the electrode assembly (100) from FIG. 4.

The illustrated prismatic secondary battery (500) shows an example where the above-described electrode assembly (100) is applied. The prismatic secondary battery (500) includes a case (510) with at least one side forming an opening, the electrode assembly (100) described above, a cap plate including a positive electrode terminal (522) and a negative electrode terminal (524) electrically connected to the positive electrode tab (110) and the negative electrode tab (120) of the electrode assembly (100), and is joined to seal the opening of the case (510), and an electrolyte (530) that fills the case (510) to impregnate the electrode assembly (100).

The detailed composition of the electrode assembly (100) is the same as described in the first embodiment, thereby repeated explanations regarding it will be omitted. From here on, the focus will be on explaining the configuration of the prismatic secondary battery (500).

The electrode assembly (100) is provided with a protective stack layer (200) on its outermost part. The positive electrode foil (210) and the negative electrode foil (220) constituting the protective stack layer (200) are provided with a positive electrode foil tab (212) and a negative electrode foil tab (222), respectively. In addition, the positive electrode foil tab (212) is electrically connected to the positive electrode tab (110) of the electrode assembly (100), while the negative electrode foil tab (222) is electrically connected to the negative electrode tab (120) of the electrode assembly (100).

In other words, the positive electrode foil tab (212) and negative electrode foil tab (222) of the protective stack layer (200) are connected, respectively, to the positive electrode terminal (522) and negative electrode terminal (524) of the cap plate (520) along with the positive electrode tab (110) and negative electrode tab (120) of the electrode assembly (100). In the illustrated embodiment, the positive electrode foil tab (212) and positive electrode tab (110) are welded together to the positive electrode lead (523). The negative electrode foil tab (222) and negative electrode tab (120) are welded together to the negative electrode lead (525).

Therefore, the protective stack layer (200) is electrically connected to the electrode assembly (100), but the positive electrode foil (210) and negative electrode foil (220) of the protective stack layer (200) do not have active materials coated on them. As a result, the protective stack layer (200) does not directly participate in the charging and discharging of the prismatic secondary battery (500).

However, in the protective stack layer (200), the positive electrode foil (210) and the negative electrode foil (220)

form a pair and are electrically connected to the positive electrode tab (522) and negative electrode tab (524) of the cap plate (520). Therefore, in the event of a short-circuit within the electrode assembly (100), the protective stack layer (200) responds before the positive electrode (20) and the negative electrode (30) of the electrode assembly (100) applied with active materials, buffering an internal short-circuit.

Therefore, the protective stack layer (200) electrically connected to the positive electrode tab (522) and negative electrode tab (524) significantly reduces the risk of damage to the electrode assembly (100) caused by internal short-circuit, as well as the risk of fire or explosion due to thermal runaway of the electrode assembly (100).

The present disclosure has been described above in more detail through the drawings and embodiments. However, the configurations described in the drawings or the embodiments in the specification are merely embodiments of the present disclosure and do not represent all the technical ideas of the present disclosure. Thus, it is to be understood that there may be various equivalents and variations in place of them at the time of filing the present application.

| [Description of reference numerals] | |
|---|---|
| 10: UNIT CELL | 20: POSITIVE ELECTRODE |
| 22: POSITIVE ELECTRODE CURRENT COLLECTOR | |
| 24: POSITIVE ELECTRODE ACTIVE MATERIAL | |
| 26: POSITIVE ELECTRODE NON-COATED REGION | |
| 30: NEGATIVE ELECTRODE | |
| 32: NEGATIVE ELECTRODE CURRENT COLLECTOR | |
| 34: NEGATIVE ELECTRODE ACTIVE MATERIAL | |
| 36: NEGATIVE ELECTRODE NON-COATED REGION | |
| 40: SEPARATOR | 100: ELECTRODE ASSEMBLY |
| 110: POSITIVE ELECTRODE TAB | 120: NEGATIVE ELECTRODE TAB |
| 200: PROTECTIVE STACK LAYER | 210: POSITIVE ELECTRODE FOIL |
| 212: POSITIVE ELECTRODE FOIL TAB | 220: NEGATIVE ELECTRODE FOIL |
| 222: NEGATIVE ELECTRODE FOIL TAB | 500: PRISMATIC SECONDARY BATTERY |
| 510: CASE | 520: CAP PLATE |
| 522: POSITIVE ELECTRODE TERMINAL | |
| 523: POSITIVE ELECTRODE LEAD | 524: NEGATIVE ELECTRODE TERMINAL |
| 525: NEGATIVE ELECTRODE LEAD | 530: ELECTROLYTE |

INDUSTRIAL APPLICABILITY

The present disclosure is a useful technology for improving the safety and enhancing the performance of secondary batteries.

The invention claimed is:

1. An electrode assembly, comprising:

a plurality of unit cells, each unit cell comprising a positive electrode, a negative electrode, and a separator between the positive electrode and the negative electrode; and a protective stack layer on an outermost part of the electrode assembly, comprising a positive electrode foil, a negative electrode foil and a separator between the positive electrode foil and the negative electrode foil and on outer surfaces of the positive electrode foil and the negative electrode foil.

2. The electrode assembly of claim 1, wherein when an outermost electrode of the electrode assembly is a positive electrode, the protective stack layer comprises a structure that is laminated in the order of: the negative electrode foil, the separator, the positive electrode foil, and the separator.

3. The electrode assembly of claim 1, wherein when an outermost electrode of the electrode assembly is a negative electrode, the protective stack layer comprises a structure that is laminated in the order of: the positive electrode foil, the separator, the negative electrode foil, and the separator.

4. The electrode assembly of claim 1, wherein the protective stack layer is disposed on both outermost parts of the electrode assembly.

5. The electrode assembly of claim 1, wherein the size of the protective stack layer is not smaller than the size of an outermost unit cell of the electrode assembly.

6. The electrode assembly of claim 1, wherein the positive electrode foil and the negative electrode foil comprise a positive electrode foil tab and a negative electrode foil tab, respectively, wherein the electrode assembly comprises a positive electrode tab and a negative electrode tab, and wherein the positive electrode foil tab is electrically connected to the positive electrode tab of the electrode assembly, and the negative electrode foil tab is electrically connected to the negative electrode tab of the electrode assembly.

7. The electrode assembly of claim 6, wherein the protective stack layer buffers an internal short-circuit occurring in the electrode assembly.

8. A prismatic secondary battery, comprising:

a housing in which at least one side forms an opening;

an electrode assembly comprising a plurality of unit cells, each unit cell comprising a positive electrode, a negative electrode, and a separator between the positive electrode and the negative electrode, and the plurality of unit cells being stored inside the housing;

a cap plate comprising a positive electrode terminal and a negative electrode terminal electrically connected to a positive electrode tab and a negative electrode tab of the electrode assembly, and is joined to seal the opening of the housing; and an electrolyte, wherein the electrode assembly further comprises a protective stack layer on an outermost part of the electrode assembly, comprising a positive electrode foil, a negative electrode foil, and a separator between the positive electrode foil and the negative electrode foil; and on outer surfaces of the positive electrode foil and the negative electrode foil, respectively, wherein the positive electrode foil and the negative electrode foil comprise a positive electrode foil tab and a negative electrode foil tab, respectively, wherein the electrode assembly further comprises a positive electrode tab and a negative electrode tab, and wherein the positive electrode foil tab is electrically connected to the positive electrode tab of the electrode assembly, and the negative electrode foil tab is electrically connected to the negative electrode tab of the electrode assembly.

9. The prismatic secondary battery of claim 8, wherein when an outermost electrode of the electrode assembly is a positive electrode, the protective stack layer comprises a structure that is stacked in the order of: the negative electrode foil, the separator, the positive electrode foil, and the separator.

10. The prismatic secondary battery of claim 8, wherein when an outermost electrode of the electrode assembly is the negative electrode, the protective stack layer comprises a structure that is stacked in the order of: the positive electrode foil, the separator, the negative electrode foil, and the separator.

11. The prismatic secondary battery of claim 8, wherein a size of the protective stack layer is not smaller than a size of an outermost unit cell of the electrode assembly.

12. The prismatic secondary battery of claim 8, wherein the protective stack layer buffers an internal short-circuit occurring in the electrode assembly.

* * * * *